United States Patent [19]
Schlanger

[11] Patent Number: 6,089,675
[45] Date of Patent: Jul. 18, 2000

[54] QUICK RELEASE BICYCLE HUB ASSEMBLY

[76] Inventor: Raphael Schlanger, 128 Hulda Hill Rd., Wilton, Conn. 06897

[21] Appl. No.: 08/914,275

[22] Filed: Aug. 19, 1997

[51] Int. Cl.⁷ .................................................. B60B 27/00
[52] U.S. Cl. .................................. 301/124.2; 301/110.5; 280/279
[58] Field of Search ............................. 301/105.1, 110.5, 301/124.2; 280/279, 288

[56] References Cited

U.S. PATENT DOCUMENTS

| | | |
|---|---|---|
| 614,232 | 11/1898 | Norton . |
| 2,532,034 | 11/1950 | Pawsat et al. ............................ 280/279 |
| 3,507,516 | 4/1970 | Fritz . |
| 3,610,659 | 10/1971 | Gerarde . |
| 3,976,307 | 8/1976 | Ogisu . |
| 4,079,958 | 3/1978 | Segawa . |
| 4,424,981 | 1/1984 | Maxwell . |
| 4,632,415 | 12/1986 | Hai . |
| 4,763,957 | 8/1988 | Poehlmann et al. . |
| 4,805,941 | 2/1989 | Downing et al. . |
| 5,121,973 | 6/1992 | Phillips ............................... 301/111 X |
| 5,549,315 | 8/1996 | Ashman . |
| 5,567,020 | 10/1996 | Phillips et al. . |
| 5,673,925 | 10/1997 | Stewart .............................. 301/124.2 X |

FOREIGN PATENT DOCUMENTS

658726  10/1951  United Kingdom ................ 301/124.2

*Primary Examiner*—Russell D. Stormer
*Attorney, Agent, or Firm*—Bachman & LaPointe, P.C.

[57] ABSTRACT

Assembly includes a bicycle hub assembly, a control shaft having opposed ends passing through the hub assembly, bicycle frame members operative to receive and retain the opposed ends of the control shaft, wherein one of the frame members includes an open slot to receive and retain one end of the control shaft and the other of the frame members includes openings for a releasable, fixed connection with the opposed end of the shaft; and a handle for manual rotation of the shaft to engage and disengage the shaft with the frame members.

43 Claims, 11 Drawing Sheets

QUICK RELEASE BICYCLE HUB ASSEMBLY

BACKGROUND OF THE INVENTION

The present invention relates to a quick release bicycle hub assembly which permits rapid removal of a bicycle wheel while at the same time permitting a secure assembly.

Generally, a hub for a bicycle is adapted to be mounted to a bicycle frame in a manner such that a main shaft, which extends through a hub shell at the center thereof, is inserted into a pair of fork ends of a bicycle frame, so that both ends of the main shaft, which protrude from the fork ends, are secured to the bicycle frame by means of tightening nuts.

This is a time consuming procedure and the nuts frequently come loose by vibration.

Also, conventional so-called quick release designs are not entirely satisfactory and may be difficult to use reliably.

It is therefore a principal object of the present invention to provide an effective and easy to use quick release bicycle hub assembly.

SUMMARY OF THE INVENTION

The foregoing objective is readily achieved in accordance with the present invention.

The quick release assembly of the present invention comprises: a bicycle hub assembly; a control shaft having opposed ends and passing through said hub assembly; first and second bicycle frame members operative to receive and retain the opposed ends of said control shaft; wherein at least the first of said frame members includes an open slot to receive one end of said shaft, and said second frame member includes means for a releasable, fixed connection with the opposed end of said shaft; means for manual rotation of said shaft; and means for retaining said shaft relative to said frame members to engage and disengage said shaft with said frame members.

Further features of and advantages of the present invention will appear hereinbelow.

BRIEF DESCRIPTION OF THE DRAWINGS

The present invention will be more readily understandable from the accompanying drawings, in which.

DETAILED DESCRIPTION OF PREFERRED ENBODIMENTS

Figure 1A:
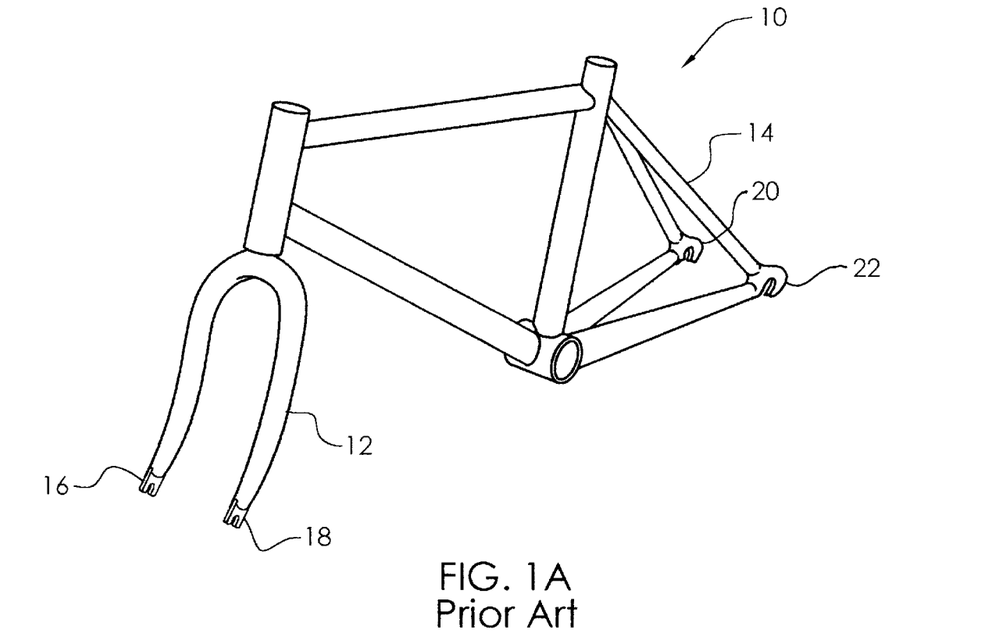
FIGS. 1A and 1B show a conventional prior art quick release assembly.
Figure 1B:
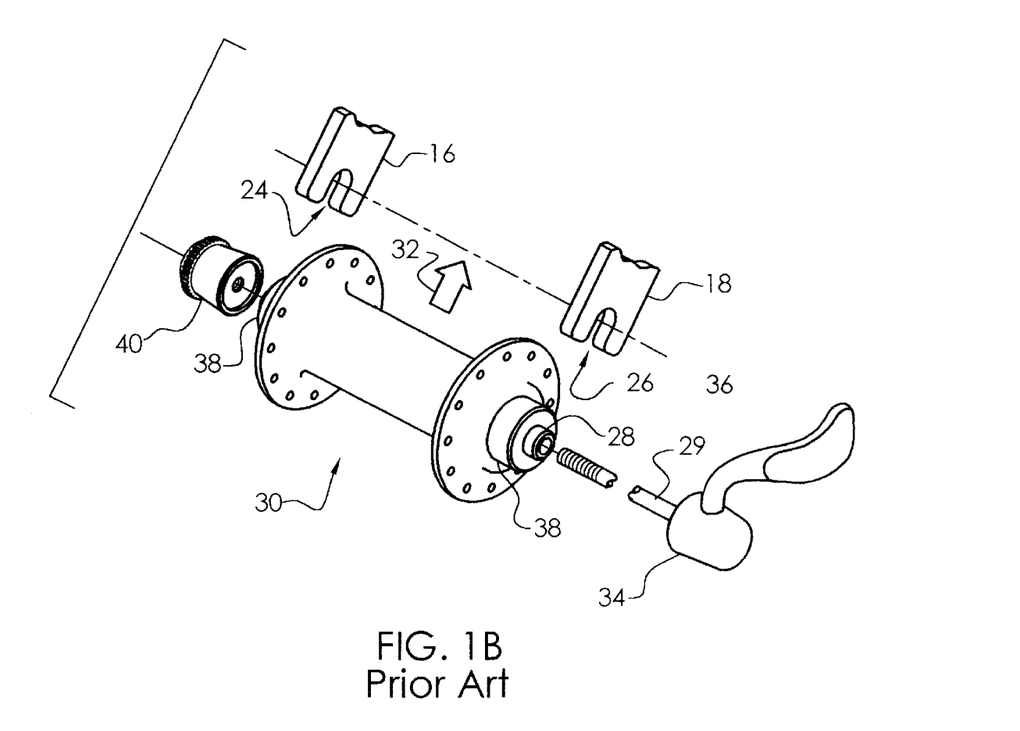

Referring to the drawings, FIGS. 1A and 1B show a typical prior art quick release hub assembly with bicycle frame 10 including front fork blade 12 and rear fork blade 14 with front dropouts 16, 18 and rear dropouts 20, 22. The front dropouts are shown in detail in FIG. 1B and are essentially flat plates 16, 18 with open slots 24, 26 to accept axle 28 of bicycle wheel hub assembly 30 which is assembled to the dropouts in the direction of arrow 32, with skewer shaft 29 passing through axle 28. The axle ends are introduced through slots 24, 26 and quick release assembly 34 is activated by lever 36 which serves to clamp and sandwich the dropouts between axle flanges 38, skewer nuts 40 and the quick release assembly 34.

The existing prior art quick release assembly has been in existence for over 50 years, but has several shortcomings. Referring to FIGS. 1A and 1B, importantly the skewer nut 40 must be adjusted properly with the skewer shaft in order for the mechanism to function as intended. If the nut is adjusted too tightly, the cam lever will not fully close and may open inadvertently, thus permitting the wheel to disengage from the dropouts. If the nut is adjusted too loosely, proper clamping pressure may not be achieved, again resulting in a dangerously inadequate connection. Proper adjustment is determined by operator "feel", thus requiring a reasonable level of experience and judgement that the layman usually does not possess. As one would imagine, numerous injuries and lawsuits have been attributed to the current quick release technology. Although there have been several designs which incorporate fail-safe projections or bumps in the dropouts intended to retain the wheel in the event of a loose connection, these designs defeat the original goal of the mechanism, no longer providing a quick release.

Further, due to geometric constraints of the prior art designs, the skewer shaft is of very small diameter, usually around 3/16 of an inch. With the advent of the mountain bike, which often includes suspension mechanisms built into the frame and fork, stresses are applied to the wheel axle which serve to stretch this undersized skewer shaft. This deformation results in a flexible and imprecise feel to the rider such that other components of the frame and fork must be overbuilt in an attempt to compensate for this shortcoming.

It is highly desirable to develop a more secure and reliable quick release hub assembly which is easy to use.

Figure 2:
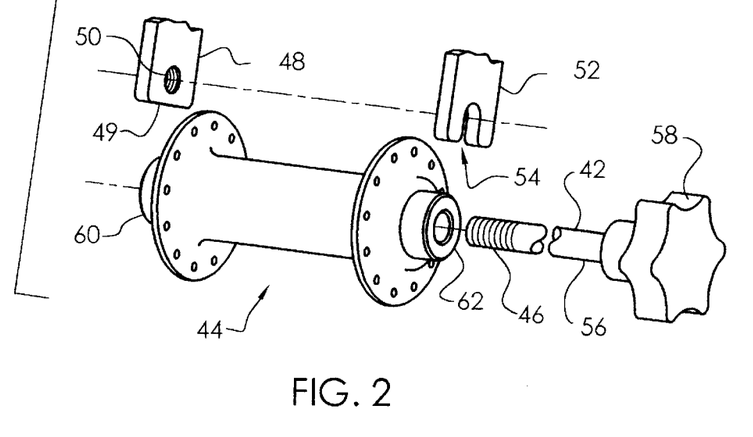
FIG. 2 illustrates an embodiment of the present invention.

The present invention is illustrated in FIG. 2, wherein the assembly of the present invention includes a control shaft 42 which passes through hub assembly 44. The control shaft may also serve as an axle. The control shaft operates via a rotary action about its axis. The control shaft 42 has a threaded end 46 which can be threadably engaged with one frame member or right dropout 48, wherein dropout 48 includes a closed base 49 and threaded hole 50 to releasably fix threaded end 46. The opposite or left dropout 52 includes open slot 54 to accept shank 56 of control shaft 42. It should be noted that most embodiments are illustrated in an application associated with front dropouts. All of the designs of the present invention may be applied to the rear dropouts as well. Naturally, dropout 48 may be right or left, and dropout 52 may be right or left. Activation of the quick release assembly of FIG. 2 is achieved by locating hub assembly 44 between dropouts 48, 52, passing control shaft 42 through the hub assembly and threading threaded end 46 into threaded hole 50 of dropout 48. By rotating the tightening knob 58, the control shaft is threadably tightened, drawing the control shaft in the direction of its axis, forcing axle flange 60 into intimate engagement with dropout 48 and clamping dropout 52 between axle flange 62 and tightening knob 58. Quick release can be easily accomplished by reversing the procedure.

Figure 3A:
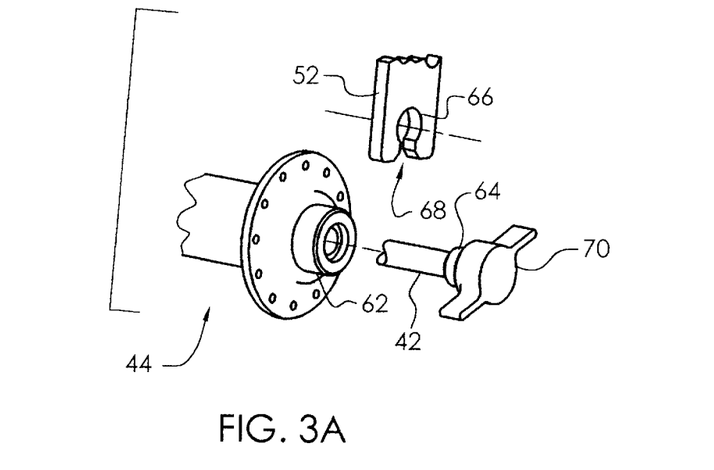
FIGS. 3A and 3B show variations of the embodiment of FIG. 2.
Figure 3B:
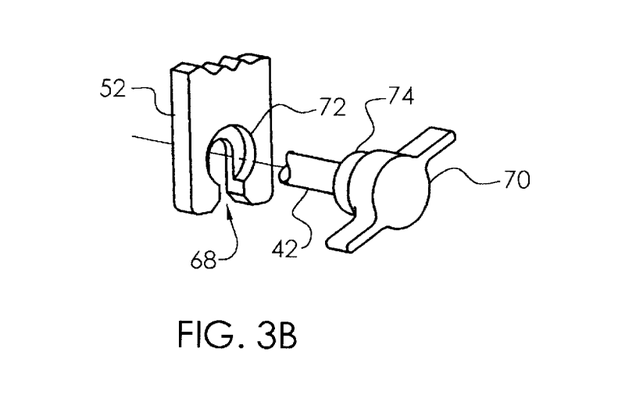

FIGS. 3A and 3B show an improvement over FIG. 2. In FIG. 3A, control shaft 42 includes an enlarged diameter portion or collar 64 on or adjacent one end thereof which engages with a circular cutout 66 in left dropout 52. This engagement is achieved by movement of control shaft 42 through open slot 68 in the base of left dropout 52, with collar or enlarged portion 64 being moved axially into engagement with recess 66. The assembly is tightened via control handle 70 in a manner as in FIG. 2. It is an advantage of this embodiment that even if the threaded connection with dropout 48 becomes loose, shaft 42 will still be retained via collar 64 and recess 66 and the wheel will not inadvertently become disengaged from the frame. Further, it is desirable that dimensions be adjusted such that, upon disassembly of the wheel from the bicycle frame, the axial length of engagement of the threaded end of the shaft extending from the hub assembly is shorter than the axial length of the overlapping engagement of the collar with the cutout at the collar end. This will insure that the control shaft will never hang up at the threaded end when the wheel is disengaged from the frame. FIG. 3B shows left dropout 52 with a circular recess 72 which engages with enlarged shaft portion 74.

Figure 4A:
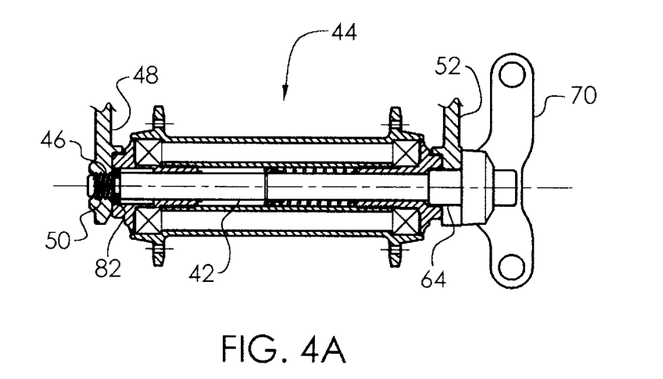
FIGS. 4A, 4B, 4C, 4D, 4E and 4F show the procedure for assembling the hub assembly to the frame using the embodiment of FIG. 3A.
Figure 4B:
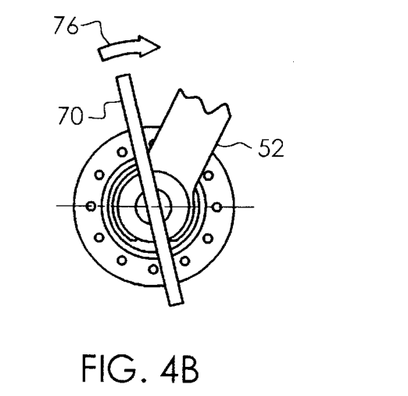
Figures 4C, 4D:
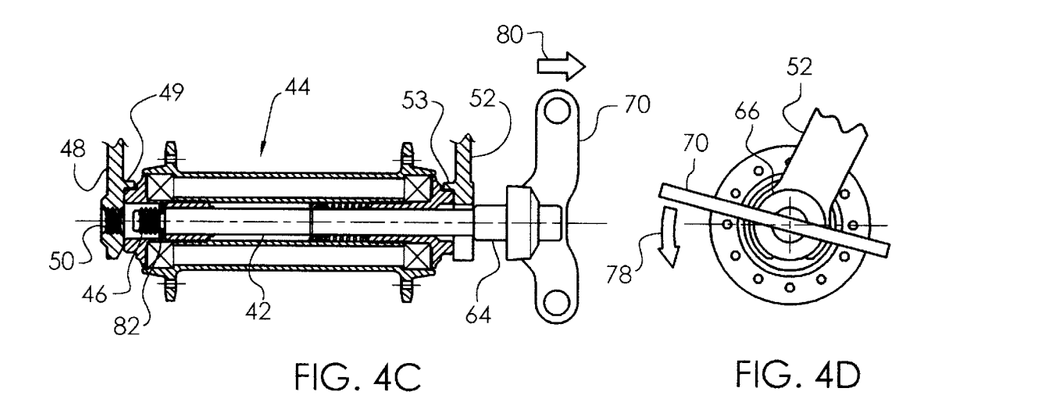
Figure 4E:
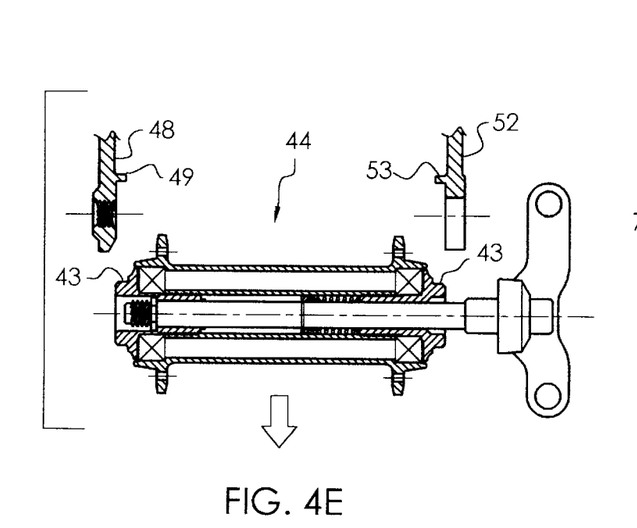
Figure 4F:
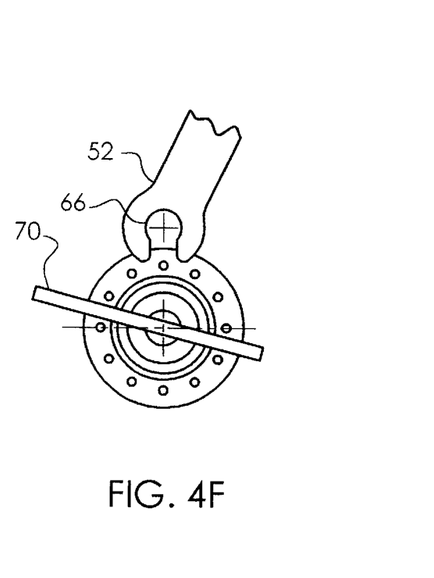

FIGS. 4A, 4B and 4C show the general assembling and disassembling procedure for the quick release assembly of the present invention. FIG. 4A shows the fully connected assembly using the assembly described in FIG. 3A, with the tightening knob or lever 70 shown in the end view of FIG. 4B. Rotation of lever 70 clockwise in the direction of arrow 76 tightens the assembly. FIGS. 4C and 4D shows the tightening lever 70 being loosened by rotating the lever counterclockwise in the direction of arrow 78. The threaded connection between right dropout 48 and shaft 42 is disengaged and the control shaft is shuttled axially in the direction of arrow 80. Note that collar 64 is now also disengaged from the circular cutout 66 in dropout 52. Note that dropouts 48 and 52 include raised ridges 49 and 53 which serve to locate axle flanges 43 while the control shaft is disengaged from the dropouts as shown in FIG. 4C. FIGS. 4E and 4F show the hub assembly 44 (and wheel) disassembled from dropouts 48, 52 and from the bicycle frame by moving the hub assembly downwards. Note that this embodiment utilizes a retaining ring 82 on the control shaft which engages the hub assembly on release of the hub assembly from the bicycle frame as shown in FIG. 4C to retain control shaft 42 with hub assembly 44, thereby minimizing the number of loose pieces which could become lost or damaged. Note that retaining ring 82 is positioned on the control shaft at a location spaced from the end thereof and spaced from the hub assembly in the assembled condition (FIG. 4A) to permit the required axial movement of the control shaft for proper quick-release function.

Figure 5A:
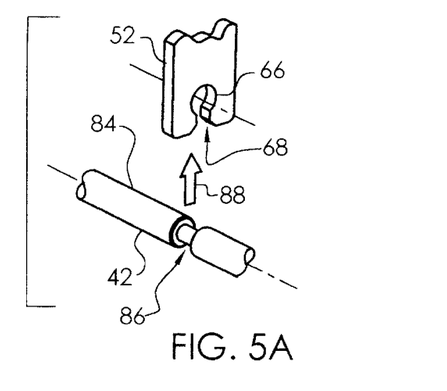
FIGS. 5A, 5B, 6A, 6B, 7A, 7B, 7C and 7D show alternate embodiments of the present invention.
Figure 5B:
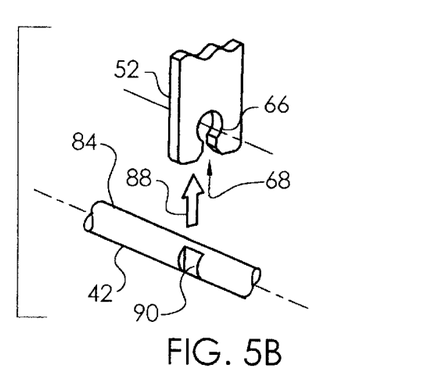

FIGS. 5A and 5B show alternate embodiments wherein the control shaft includes a relieved or smaller diameter region so that the control shaft may readily assemble with the dropout in the smaller diameter region and the full diameter region can then engage the enlarged circular cutout. Thus, referring to FIG. 5A, control shaft 42 has a full diameter portion 84 extending essentially over the entire length thereof, and a discrete portion 86 with a reduced diameter relative to full diameter portion 84. Dropout 52 includes circular or annular cutout 66 and open slot 68 adjacent and connected to cutout 66, wherein slot 68 has a smaller diameter than cutout 66. Shaft 42 is assembled to dropout 52 by movement in the direction of arrow 88 with reduced diameter portion 86 passing through slot 68 and shaft 42 then moved axially to engage full diameter portion 84 with cutout 66. FIG. 5B is similar to FIG. 5A, with control shaft 42 including flat portion 90 as a reduced diameter portion.

Figure 6A:
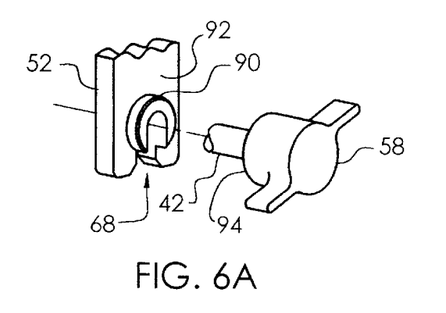
Figure 6B:
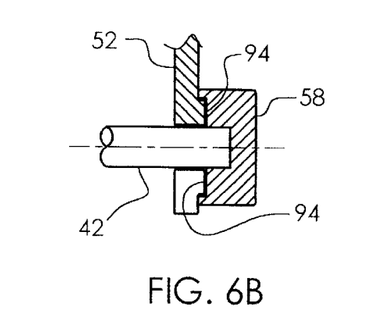

FIGS. 6A and 6B describe an alternate embodiment wherein a dropout, as left dropout 52, includes a raised portion or boss extending from a surface of the dropout facing the control knob or lever. The raised portion or boss is desirably circular or annular, is concentric with the elongated slot and is sized to fit within a recessed portion of the knob or lever. The function of this arrangement is similar to FIGS. 3A and 3B in that even if the threaded connection of the control shaft becomes loosened the shaft will still be retained by the dropouts and the hub and wheel will not inadvertently become disengaged from the frame, thereby providing an additional measure of safety for the connection. Thus, referring to FIGS. 6A and 6B, dropout 52 including open slot 68 sized to fit control shaft 42 includes raised portion or boss 90 extending from a face or surface 92 of dropout 52 towards control knob 58. Knob 58 includes recess 94 sized to fit the circular or annular boss, as described above.

Figure 7A:
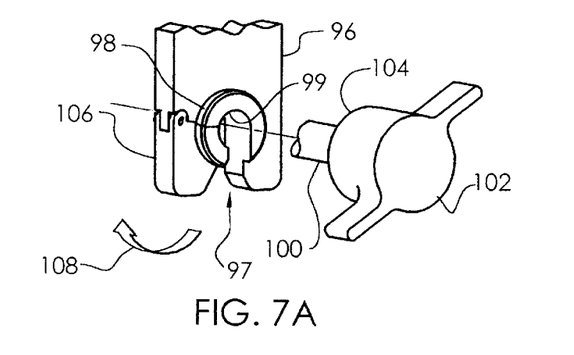
Figure 7B:
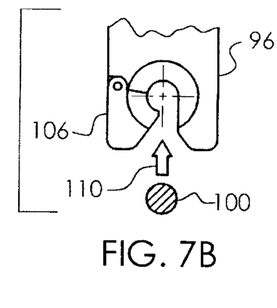
Figure 7C:
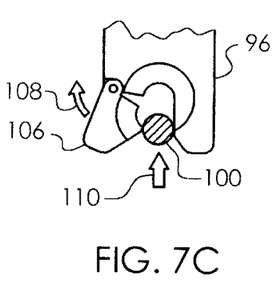
Figure 7D:
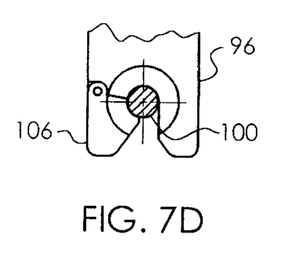

FIGS. 7A–7D show an alternate embodiment similar to FIGS. 6A–6B. FIG. 7A shows dropout 96 with raised portion or boss 98 similar to boss 90 in FIG. 6A and circular cutout 99. Control shaft 100 is activated by control lever or knob 102 and includes recess 104 sized to fit the circular or annular boss in a manner after FIG. 6A. However, dropout 96 employs a hinged portion 106 bordering slot 97 and cutout 99 which is allowed to swing out of the way as shown in FIG. 7C in the direction of arrow 108 and permit control shaft 100 to be slid up to and into circular opening 99 in the direction of arrow 110 as shown in FIGS. 7B–7D. When the control shaft 100 is in the circular opening as shown in FIG. 7D, undercut or hinged portion 106 swings back into place and serves to retain control shaft 100 in place. The hinged portion also contains a portion of raised boss 98 so that when the raised boss is engaged with mating recess 104 in knob 102, the hinged portion and shaft are locked in the retained position. Thus, FIG. 7A shows a dropout with a disengageable undercut.

Figure 8A:
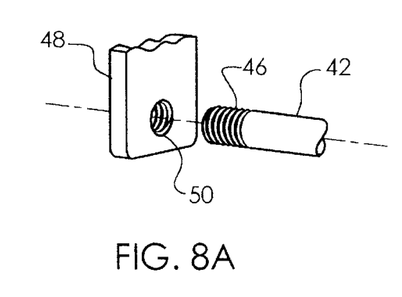
FIGS. 8A, 8B, 9A, 9B and 10 show alternate embodiments of the threaded connection with a bicycle frame member.
Figure 8B:
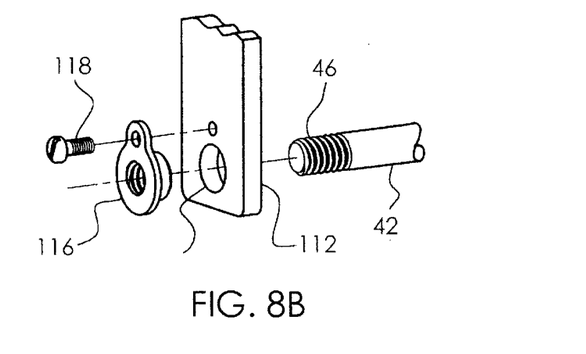

FIGS. 8A and 8B show the right dropout 48 or second frame member including a releasable fixed connection with threaded end 46 of shaft 42. In accordance with FIG. 8A, right dropout 48 includes a threaded hole 50 for engagement with threaded end 46 of shaft 42, as shown in FIG. 2. In accordance with the variation shown in FIG. 8B, right dropout 112 includes a non-threaded through hole 114 that is fitted with a threaded insert 116. The insert is retained in hole 114 by any desired means, as by one or more screws 118, which also serve to prevent rotation of the insert relative to the dropout. An insert such as shown in FIG. 8B is particularly useful in cases where the dropout material is aluminum or some other soft material which would not be able to provide robust threads.

Figures 9A, 9B, 10:
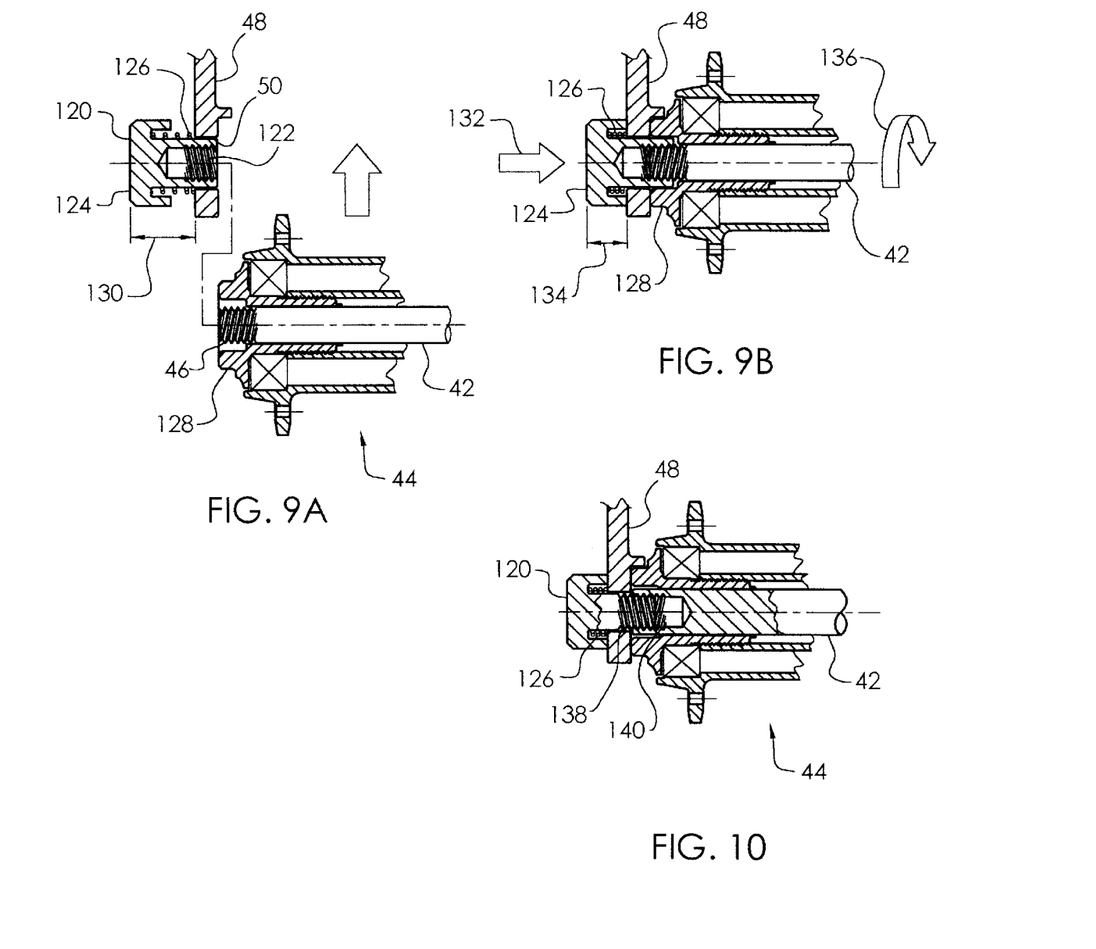

FIGS. 9A, 9B and 10 show variations over the embodiment of FIG. 8B. FIG. 9A shows the components unassembled and FIG. 9B shows the components of FIG. 9A in the assembled condition. In FIG. 9A, threaded insert 120 is provided with internal threads 122, an insert nut or head 124 and a compression spring 126. Thus, insert 120 has a loose fit with hole 50 in dropout 48 that permits axial movement of the insert. In this case, instead of the control shaft 42 shuttling axially to meet the stationary threads of the dropout, the threaded insert 120 is moved axially to meet and firmly engage the threaded end 46 of shaft 42. In the unassembled condition shown in FIG. 9A, insert 120 and nut 124 is in the withdrawn position providing clearance shown by arrow 130 which allows axle flange 128 to be slid into place. In the assembled condition shown in FIG. 9B, insert 120 and nut 124 are pushed in the direction of arrow 132 into the engaged position with reduced clearance between nut 124 and dropout 48 shown by arrow 134 facilitating the threaded connection between shaft 42 and insert 120 as by rotating shaft 42 in the direction of arrow 136. Spring 126 may be provided between insert 120 and dropout 50 to bias the insert prior to assembly. Thus, threaded insert 120 may be pushed into engagement with shaft 42 and likewise may be withdrawn to provide clearance for hub and control shaft assembly. The control shaft may draw the insert through the dropout, thereby clamping the dropout between the insert and axle flange.

In the variation of FIG. 10, which is similar to FIGS. 9A and 9B, insert 120 includes male threads 138 which mate with female threads 140 of shaft 42.

Figure 11A:
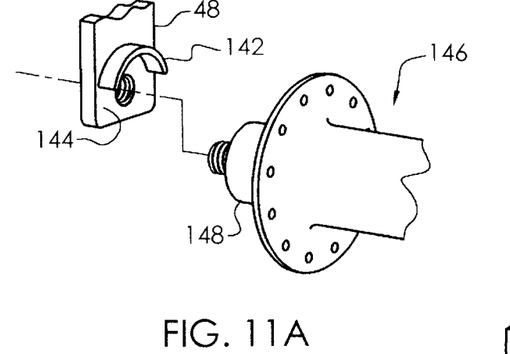
FIGS. 11A, 11B, 11C and 12 show alternate embodiments which serve to correctly locate the hub assembly.
Figure 11B:
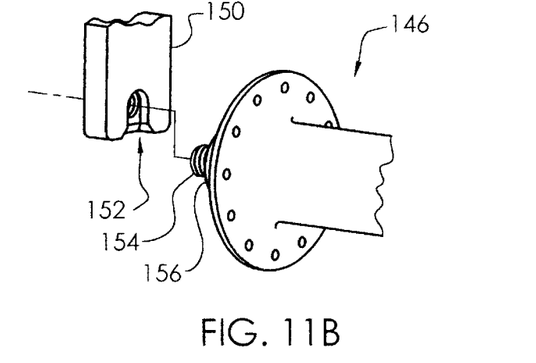
Figure 11C:
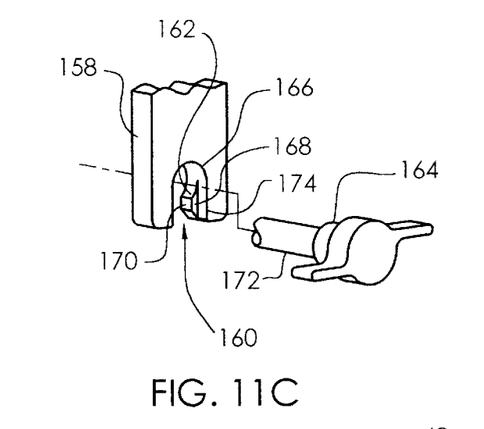

FIGS. 11A, 11B and 11C show embodiments which include locating means on one or more dropouts which serve to locate the hub assembly in the correct location relative to the dropouts prior to assembly of the control shaft with said dropouts. This is particularly important since it provides an excellent operator aid in allowing the quick-release device of the present invention to be truly "quick", rather than have the operator fumble around to achieve proper alignment with the wheel in the dropouts, while at the same time having to operate the control shaft. Although these figures show either the threaded or the slotted connections with the dropout, these embodiments may be configured to correspond with connections at either dropout.

FIG. 11A shows dropout 48 including raised ridge 142 on inside surface 144 of dropout 48 facing hub assembly 146 for abutment with axle flange 148 of hub assembly 146. When the axle flange abuts and is located by the raised ridge, the hub assembly and control shaft are in the proper position for engagement with the dropouts. While a raised ridge is shown here on the inside face of the dropout to engage with the axle flange, one could incorporate a raised ridge on the outside surface of the slotted dropout which would locate the control shaft knob surface.

FIG. 11B shows dropout 150 including open slot recess or channel 152 which serves to locate the protruding stub end 154 of the control shaft. During assembly of the hub assembly 146, including axle flange 156, with the dropout (s), the control shaft stub slides up and is aligned by the open slot recess. When the control shaft stub abuts the upper surface of the recess, it is in the correct alignment to be engaged with the dropout(s).

FIG. 11C shows an arrangement similar to FIG. 11B applied to a slotted dropout-to-control shaft engagement. As shown in FIG. 11C, dropout 158 includes open slot 160 connected to circular cutout 162 which is sized for collar 164 and including an upper recessed surface 166. The open slot 160 includes inwardly extending projections 168 below cutout 162 which define a narrow passageway 170 sized to fit control shaft 172 and form open slot recess 174 adjacent projections 168. During assembly of the hub with the dropout, control shaft 172 slides between projections 168, collar 164 slides up and is correctly aligned with cutout 166 for axial movement and assembly therein. When collar 164 abuts upper surface 166 of cutout 162, it is in the correct alignment.

Figure 12:
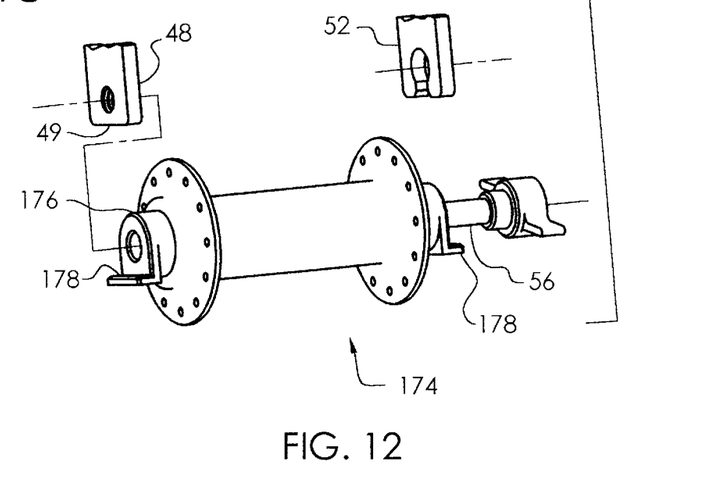

FIG. 12 shows an embodiment similar to FIG. 11B wherein the hub assembly, particularly the axle flanges, has a geometry operative to align and locate the hub assembly with the dropout(s), permitting the control shaft to be accurately aligned with the dropout(s), facilitating quick assembly. Thus, in accordance with the embodiment of FIG. 12, the hub assembly includes means engageable with the dropout(s) which serve to properly position the hub assembly. This embodiment is similar to FIGS. 11A–11C, except in FIG. 12 it is the hub assembly which contains the geometry to engage the dropout(s) rather than the dropout(s) containing the geometry to engage the hub assembly. Referring to FIG. 12, hub assembly 174 includes axle flanges 176 having flat extensions 178 which rest against the base 49 of right dropout 48. The same may be provided for left dropout 52. Thus, when flat extensions 178 bear against corresponding surface 49 of dropout 48, the control shaft 56 is in correct alignment to be fitted and assembled through the dropout.

FIGS. 13A–13E show alternate embodiments wherein the control shaft includes anti-rotation means engageable with one dropout. In these embodiments, the control shaft includes a head portion which is engageable with a recessed portion in the dropout. The control knob or lever may then be used to tighten the assembly by bearing against the outside surfaces of the dropouts, thereby clamping the hub assembly between the inside surfaces of the dropouts.

Figure 13A:
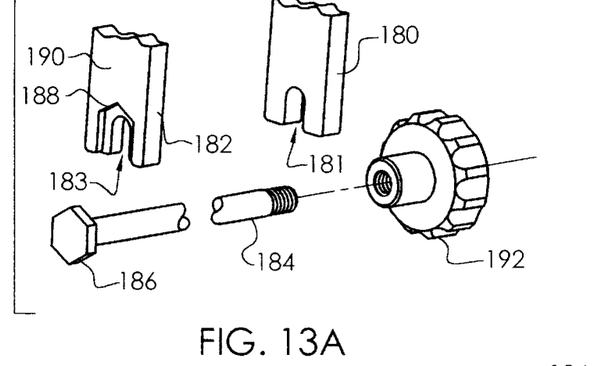
FIGS. 13A, 13B, 13C, 13D and 13E show alternate embodiments which use two slotted bicycle frame members or dropouts.

Thus, referring to FIG. 13A, left dropout 180 is a slotted dropout with slot 181, and right dropout 182 is also a slotted dropout with slot 183. Control shaft 184 includes a shaped head member, as hexagonal head 186 which is engageable with recess 188 in the outside face 190 of right dropout 182 having a configuration to mate with head 186. Knob 192 on the opposite side of shaft 184 is used for tightening the assembly. Thus, a secure anti-rotation assembly is provided.

Figure 13B:
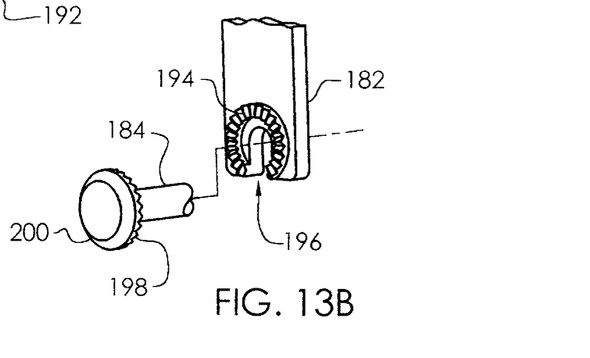

The variation of FIG. 13B shows right dropout 182 having ridges 194 and slot 196, to engage teeth 198 of control shaft 184, head 200. The operation is similar to FIG. 13A.

Figure 13C:
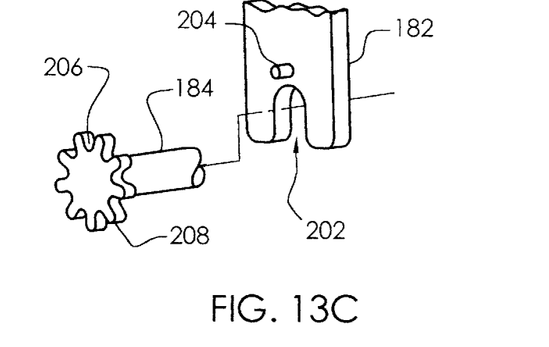

The variation of FIG. 13C shows right dropout 182 with slot 202 and outwardly protruding locking pin 204 to engage in slots 206 of knurled head 208 of control shaft 184. The operation is similar to FIG. 13A.

Figure 13D:
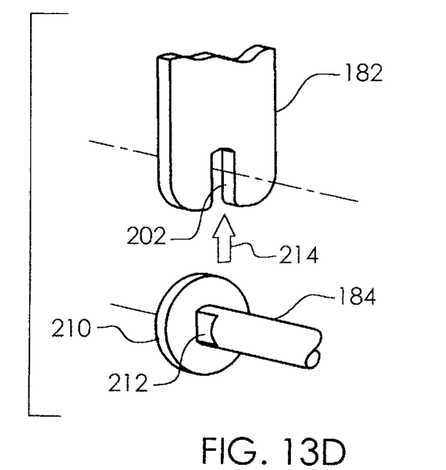
Figure 13E:
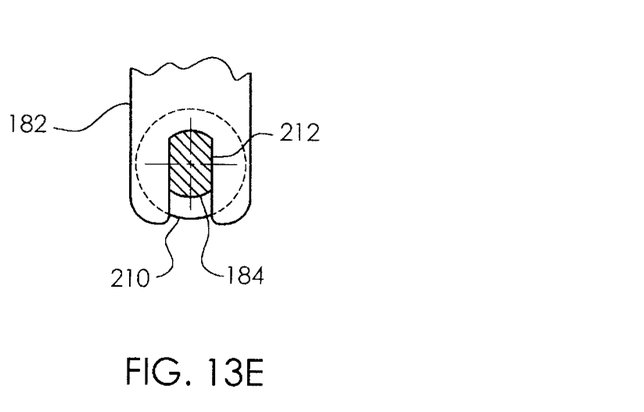

The variation of FIGS. 13D–13E show right dropout 182 with slot 202. Control shaft 184 has enlarged head 210 and in part a non-circular geometry, as flat portions 212 which may be milled in the control shaft and which are securely engaged in slot 202 in the direction of arrow 214. FIG. 13E shows the assembled components.

Figure 14A:
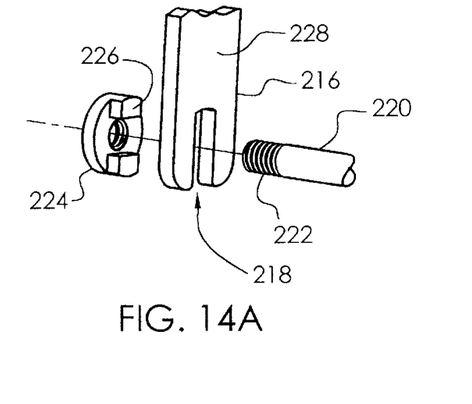
FIGS. 14A, 14B and 14C show alternate embodiments with anti-rotation features.
Figure 14B:
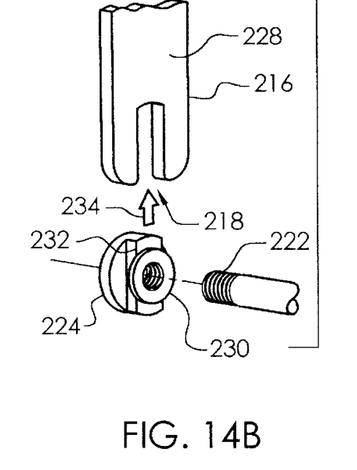
Figure 14C:
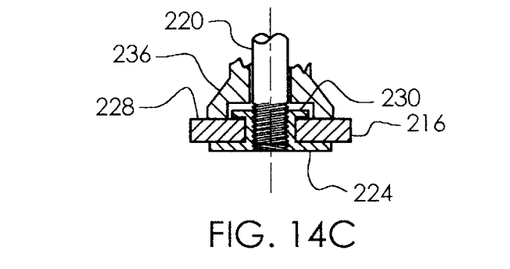

FIGS. 14A–14C show further anti-rotation embodiments wherein an anti-rotation member is engageable with at least one of the frame members and with the control shaft. Thus, FIG. 14A shows right dropout 216 with slot 218 and control shaft 220 with threaded end 222 mates and engages. Threaded end 222 with threaded nut 224 which contains raised extensions or bosses 226 which engage with slot 218 to prevent rotation of nut 224. The control shaft can be threaded into nut 224 for a quick-release, anti-rotation assembly.

FIGS. 14B and 14C are similar to FIG. 14A, with threaded nut 224 including inwardly extending threaded extension 230 and flanges 232 which are disposed in slot 218 in the direction of arrow 234 so that flanges 232 engage slot 218 of dropout 216 and extension 230 engages the inside face 228 of dropout 216 as shown in the assembled view of FIG. 14C. Axle flanges 236 firmly engage the inside face 228. Extension 230 locates nut 224 within dropout 216. Thus, a quick release, anti-rotation assembly is provided with extension 230 providing a retaining means.

Figure 15A:
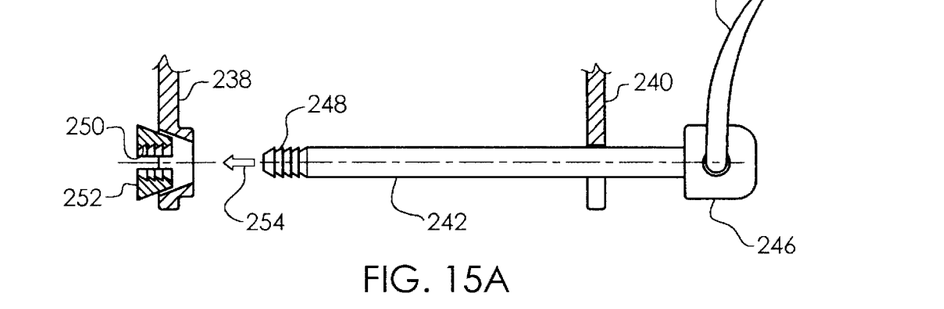
FIGS. 15A and 15B show an alternate embodiment with a push-through connection.
Figure 15B:
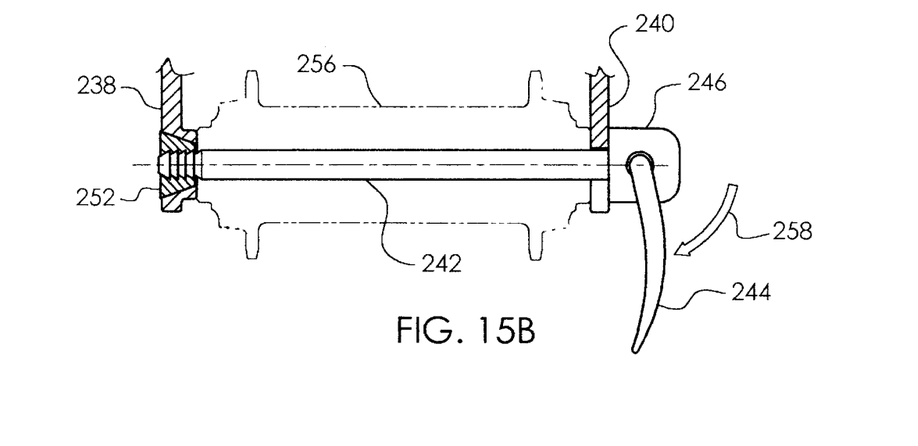

FIGS. 15A and 15B show an alternate embodiment wherein the control shaft is engageable with at least one frame member by axially pushing the control shaft into a locking means of a frame member. In accordance with this embodiment, the control shaft and frame member include engageable locking means actuated by pushing the respective locking means into locking engagement. FIGS. 15A and 15B show right and left dropouts 238 and 240, respectively, with the left dropout being slotted, and control shaft 242 with clamping lever 244 and cam cover 246. Control shaft 242 includes a knurled end portion 248 engageable with knurled portion 250 of split collar 252 of right dropout 238 by pushing knurled end portion 248 into engagement with knurled portion 250 in the direction of arrow 254, thus providing an axially locked connection. Further clamping and release of the dropouts may be actuated by a threaded connection or by cam lever 244 which drives cam cover 246 against dropout 240 as shown in FIG. 15B by arrow 258, thereby clamping hub assembly 256 (shown in phantom in FIG. 15B).

Figures 16A, 16B, 16C, 17:
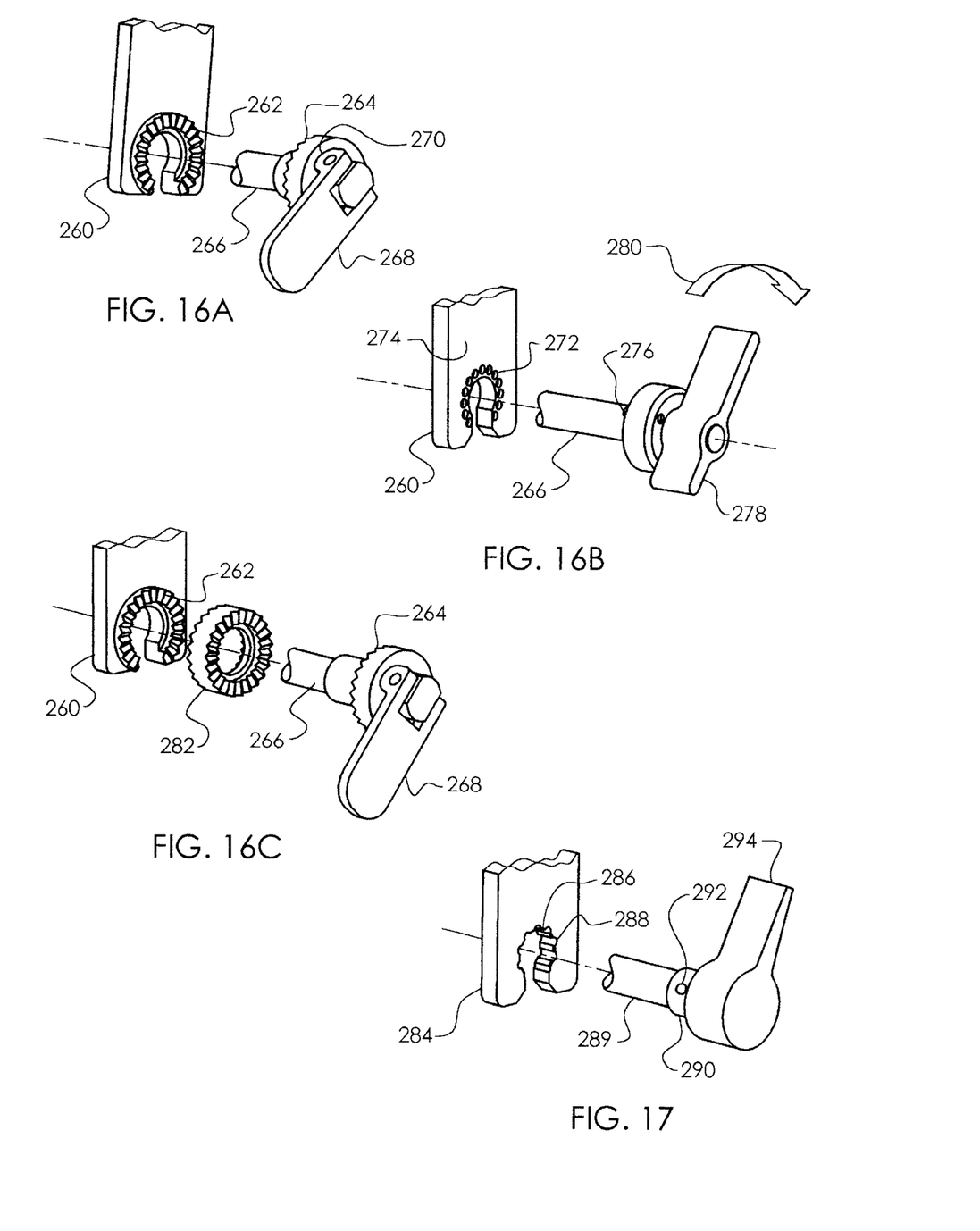
FIGS. 16A, 16B, 16C and 17 show further embodiments with anti-rotation locking features.

FIGS. 16A–16C illustrate further embodiments with an anti-rotation locking feature which is intended to selectively limit or prevent or restrict rotation of the control shaft relative to the dropouts. This locking feature is selective in that it permits normal rotation and operation of the control shaft while in the unlocked position, then, after assembly is complete, the locking feature is activated, providing rotationally locking engagement between the dropout and control shaft. This feature provides the additional safety feature insuring that the control shaft can never unscrew from the dropout. Note that these embodiments and features may be adapted to provide only frictional locking which, although somewhat less secure than positive locking, may provide adequate resistance to the unthreading of the control shaft. Note also that these embodiments are representative and other designs and arrangements may be provided within the scope of the present invention to provide the same function and result.

Referring to FIG. 16A, dropout 260 includes knurled face 262 which engages with knurled face 264 on control shaft 266. Control lever 268 actuates cam 270 which serves to drive knurled face 264 against knurled face 262 of dropout 260, providing a firm, anti-rotation engagement.

FIG. 16B shows dropout 260 including pockets as detent pockets 272 on outside face 274 of dropout 260. Control shaft 266 includes a projection as ball detents 276 facing outside face 274. Rotation of lever 278 in the direction of arrows 280 pushes detent 276 into engagement with one of detent pockets 272, thereby locking the control shaft in engagement with the dropout and providing a firm, anti-rotation engagement.

FIG. 16C shows a design similar to FIG. 16A which includes intermediate knurled face washer 282 that is retained with control shaft 266. Activation of cam lever 268 locks the control shaft 266 with dropout 260 as in FIG. 16A.

FIG. 17 shows a further embodiment of an anti-rotation feature. Dropout 284 includes circular cutout 286 including detent pockets 288 on the inside surface of cutout 286. Control shaft 289 includes collar portion 290 with at least one spring loaded ball plunger or detent 292 thereon and control knob 294 connected thereto. The detent plunger 292 engages with the detent geometry of the circular cutout of the dropout. As the collar is rotated by control knob 294, the plunger 292 snaps into and out of the detent pocket locations. When the control shaft is tight, the detent plunger can be engaged with a detent pocket to provide a frictional safety feature since the detent engagement will restrict any inadvertent unthreading rotation of the control shaft.

Figure 18A:
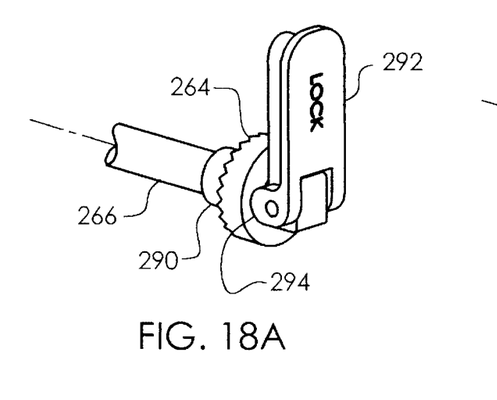
FIGS. 18A and 18B show a further embodiment similar to the embodiments of FIGS. 16A, 16B and 16C.
Figure 18B:
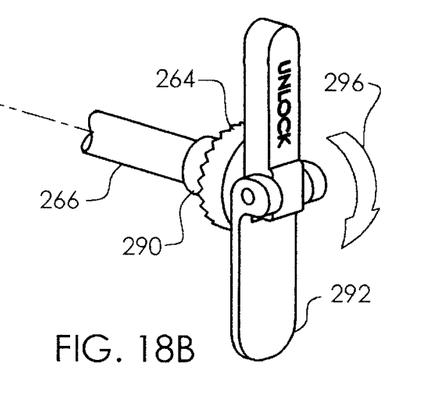

FIGS. 18A–18B show a further embodiment wherein the control knob includes an articulating member having a locked and unlocked position. Thus, control shaft 266 includes collar 290 and knurled face washer 264 as in FIG. 16A engageable with a dropout knurled face as shown in FIG. 16A. Locking lever 292 includes cam surface 294 which engages knurled face washer 264. FIG. 18A shows the locking lever 292 in the locked position. When locking lever 292 is moved in the direction of arrow 296 as shown in FIG. 18B, the locking lever is in the unlocked position, the knurled face washer 264 is withdrawn away from the mating dropout face and the control shaft is free to rotate in the direction of arrow 298. Also, when the locking lever is in the open position, a "wing-nut" configuration is created as shown in FIG. 18B, allowing greater manual torque to be applied to the control shaft assembly. When the articulating member is in the closed or folded or locked position, the member maintains a low profile appearance and provide clearance for other obstructions which may exist. In addition, in the illustrated embodiment, a cam surface is included with the articulating member such that in the locked position the cam surface drives the knurled face into locking engagement with the dropout.

Figure 19A:
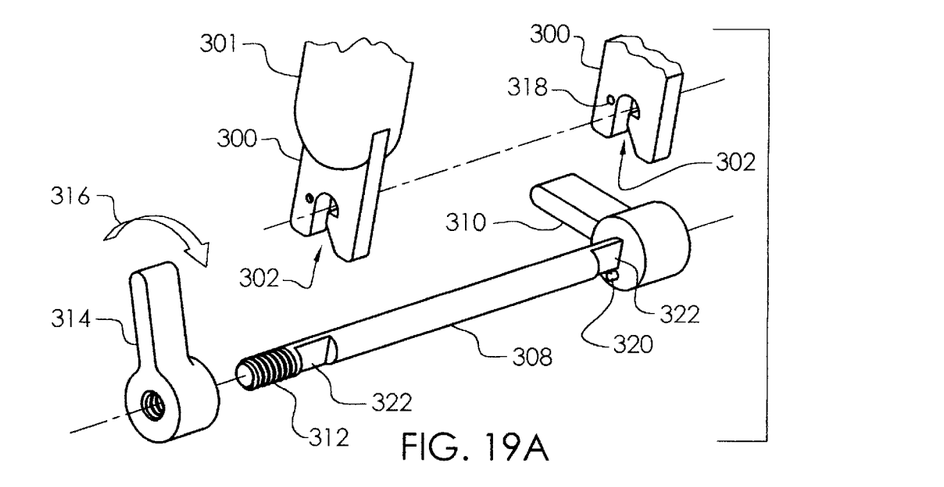
FIGS. 19A, 19B, 19C, 19D, 20A, 20B, 20C, 20D, 21A and 21B show further embodiments of the present invention.
Figure 19B:
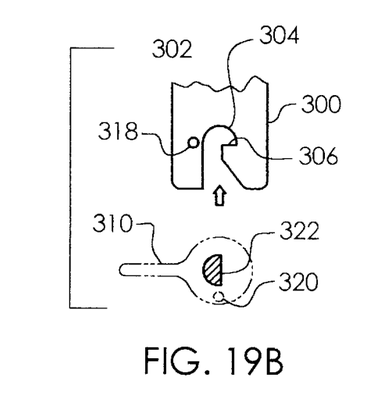
Figure 19C:
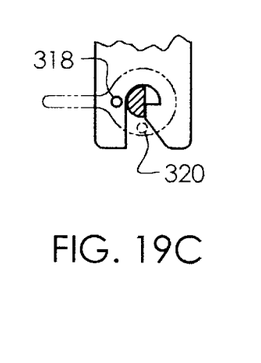
Figure 19D:
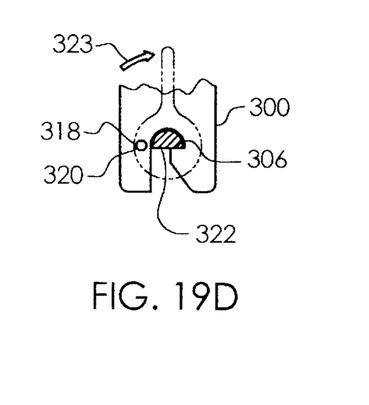

FIGS. 19A–19D show an embodiment where the control shaft has one or more relieved flats on the surface thereof which are retained in the dropout(s). Thus, dropouts 300 connected to fork blades 301 include slots 302 which connect to enlarged cutout 304 having a retaining ledge 306. Control shaft 308 includes control lever 310, threaded end portion 312 and threaded lever 314 engageable with threaded end 312 by rotation in the direction of arrow 316. Dropout 300 may include ball detent socket 318 engageable with spring loaded detent 320 on control lever 310. Control shaft 308 includes relieved noncircular portions 322, as for example flat portions, cut into the surface thereof which are retained in the dropouts by rotating the shaft as shown in the direction of arrow 322. FIG. 19B shows the relieved, flat portion 322 as it is being brought into engagement with dropout 300. The flat portion is oriented as shown such that it is able to pass through narrower open slot 302 into cutout 304. FIG. 19C shows the control shaft in engagement with the dropout. Note the locations of detent 320 and detent socket 318. FIG. 19D shows the fully engaged position 324 with the control shaft rotated clockwise in the direction of arrow 323 via lever 310. The flat face 322 is now held by retaining ledge 306 and faces downwards so that the geometry of the dropout cutout 304 serves to retain the control shaft firmly in place. Note that detent 320 and detent slot are now aligned in the assembled condition, thereby restricting back rotation of the control shaft and insuring that the control shaft remains retained with the dropout cutout. The threaded lever, if used, may now be rotated to clamp the dropouts as in other embodiments.

Figure 20A:
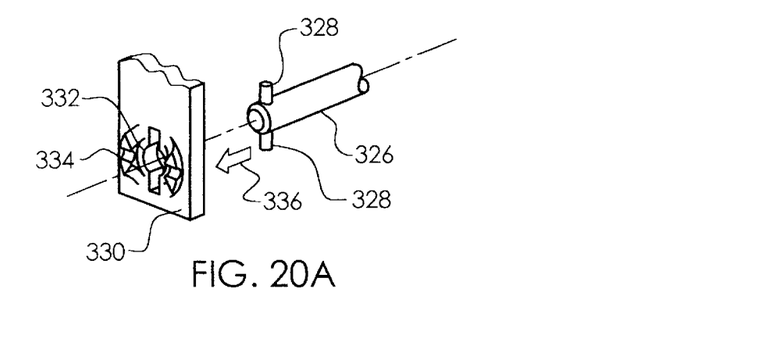
Figure 20B:
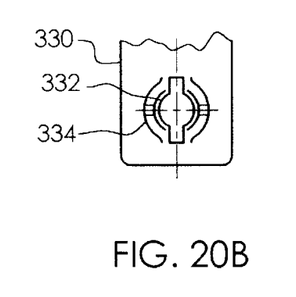
Figure 20C:
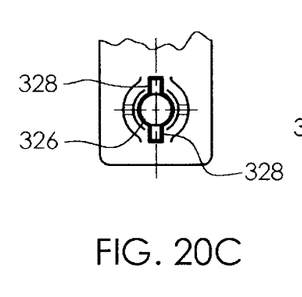
Figure 20D:
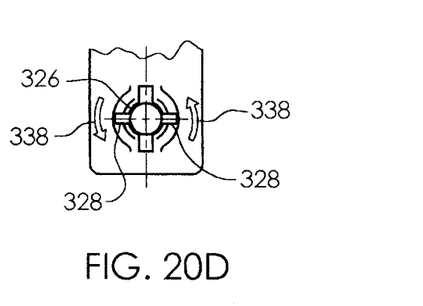

FIGS. 20A–20D show a further embodiment of the present invention similar to FIGS. 19A–19D wherein the control shaft includes at least one locking tang extending outwardly from the control shaft and engageable with a pocket on an outside surface of a cutout portion of a dropout. Thus, control shaft 326 includes locking projections or tangs 328 extending outwardly from the shaft. Dropout 330 includes opening 332 and cam surface 334. The control shaft engagement with mating dropout thus contains "quarter-turn" geometry. The control shaft may pass through the opening in the dropout by moving the shaft in the direction of arrow 336, but when the control shaft is rotated the orientation of the mating geometries is altered creating an overlay or interference between the two components, thereby mating and retaining the control shaft with the dropout. FIG. 20B shows the dropout 330 prior to assembly with the control shaft. FIG. 20C shows the control shaft assembled to the dropout by passing through opening 332 in dropout 330. FIG. 20D shows the control shaft rotated in the direction of arrows 338 and locked into position with dropout 330. Rotation in the direction of arrows 338 cause tangs 328 to engage cam surface 334, thereby providing clamping action to the dropout. As shown, one may incorporate cam surfaces in the control shaft assembly and/or the dropout which would serve to clamp the dropouts as the control lever is rotated, eliminating the need for a threaded connection. Thus, the locking tangs provide engagement when rotated and the cam surfaces provide clamping pressure.

Figure 21A:
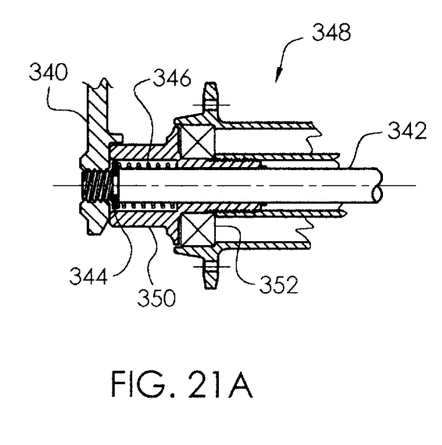
Figure 21B:
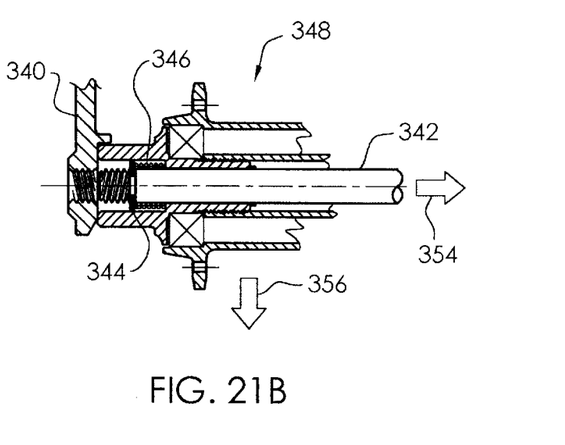

FIGS. 21A–21B show an enhancement to the quick release assembly. Dropout 340 is threadably engaged with shaft 342 as shown in FIG. 21A which includes a retaining means, as outwardly extending flanges 344 extending therefrom. Compression spring 346 engages between flanges 344 and hub assembly 348 serving to bias the control shaft towards the dropout and engage axle flange 350 therewith, with hub bearings 352 provided in the hub assembly. When the control shaft 342 is withdrawn from dropout 340 in the direction of arrow 354 as shown in FIG. 21B, compressing spring 346 into the hub assembly 348 and thus creating the necessary clearance to remove the hub assembly from the dropouts in the direction of arrow 356. The spring 346 serves to effectively position the shaft and retain same in position in the engaged condition shown in FIG. 21A.

Naturally, further embodiments, variations and combinations of the foregoing will readily appear to those skilled in the art.

Thus, the present invention provides a quick release assembly which provides significant advantages over the prior art. A quick release mechanism is provided which is easy to use and requires no adjustment, whose operation is generally self explanatory to the layman, which provides a mechanism to prevent inadvertent loosening of the assembly and further provides wheel retention in the event of a loose connection, and whose function provides for truly quick releasing of the wheel from the dropouts. Further, the present design is constructed from a minimum of reasonably simple components to provide high reliability and competitive manufacturing cost. Still further, since the present design does not possess the geometric constraints of the prior art designs, the quick release assembly of the present invention may be designed to provide a robust and rigid assembly of the wheel to the dropouts without the strength or flex of the prior art designs, particularly in the case of suspension mountain bikes.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. Quick release bicycle hub assembly, which comprises: a bicycle hub assembly; a control shaft having opposed ends and passing through said hub assembly; first and second bicycle frame members operative to receive and retain the opposed ends of said control shaft; wherein at least the first of said frame members includes an open slot to receive one end of said shaft, and said second frame member includes means formed on the second frame member for a releasable, fixed connection with the opposed end of said shaft to limit rotation of the opposed end of said shaft; and means for retaining said shaft relative to said frame members to engage and disengage said shaft with said frame members.

2. Assembly according to claim 1, wherein said hub assembly includes axle flanges retained between said bicycle frame members.

3. Assembly according to claim 1, including a retaining means on the control shaft which engages the hub assembly on release of the hub assembly from the bicycle frame.

4. Assembly according to claim 3, wherein said retaining means retains the shaft with the hub assembly while permitting axial movement of the shaft for disengagement of the shaft from the bicycle frame.

5. Assembly according to claim 3, wherein said retaining means includes a spring means engaged between the retaining means and hub assembly.

6. Assembly according to claim 1, wherein said shaft includes a region of reduced dimension for ease of assembly to said first frame member.

7. Assembly according to claim 1, including means for manual rotation of said shaft.

8. Assembly according to claim 7, including means adjacent one end of said control shaft to facilitate manual rotation of the control shaft.

9. Assembly according to claim 1, including locating means on at least one of said frame members which serve to position the hub assembly.

10. Assembly according to claim 9, wherein said locating means comprise a raised ridge on a surface of said frame member.

11. Assembly according to claim 9, wherein said locating means comprise an open slot recess in said frame member.

12. Assembly according to claim 11, wherein said open slot includes a narrow opening connected to an enlarged cutout for receiving an enlarged collar of said control shaft.

13. Assembly according to claim 1, including locating means on said hub assembly.

14. Assembly according to claim 13, wherein said locating means are engageable with at least one of said frame members which serve to position the hub assembly.

15. Assembly according to claim 1, wherein the control shaft includes a head portion engageable with a recessed portion in one of said frame members.

16. Assembly according to claim 1, wherein the control shaft includes a non-circular geometry engageable with at least one of said frame members.

17. Assembly according to claim 16, wherein said control shaft includes at least one noncircular portion which is rotatable into locking engagement with at least one of said frame members.

18. Assembly according to claim 1, including an anti-rotation member engageable with at least one of said frame members and with said shaft.

19. Assembly according to claim 18, wherein said anti-rotation member includes extensions engageable with an inside face of at least one frame member.

20. Assembly according to claim 18, wherein said anti-rotation means has a locked position engaged with one frame member and an unlocked position disengaged from said one frame member, wherein rotation of the control shaft is permitted in the unlocked position and wherein the control shaft is locked against rotation in the locked position.

21. Assembly according to claim 18, wherein said shaft includes a knurled face engageable with a knurled face on said frame member.

22. Assembly according to claim 18, including a spring loaded detent engageable with a pocket on a surface of said frame member.

23. Assembly according to claim 18, including an articulating member operatively connected to said anti-rotation means and having a first position where the anti-rotation means is locked in place and a second position where the control shaft is free to rotate.

24. Assembly according to claim 18, wherein said shaft includes a knurled face engageable with a face on said frame member.

25. Assembly according to claim 1, wherein said control shaft and a frame member include engageable locking means actuated by pushing the respective locking means into locking engagement.

26. Assembly according to claim 1, wherein said shaft includes a projection and a means rotatable with respect to the frame member, wherein said rotation creates an overlay engagement between the projection and frame member.

27. Assembly according to claim 26, wherein said projection is at least one locking tang extending outwardly from the shaft engageable with said frame member.

28. Assembly according to claim 1, wherein said control shaft includes an enlarged portion operative to bear against one of said frame portions.

29. Assembly according to claim 1, including means for shifting the control shaft axially with respect to the hub assembly to bring the control shaft into and out of engagement with at least one frame member.

30. Assembly according to claim 1, including spring means between said hub assembly and control shaft to axially bias the control shaft as an aid to at least one of assembly and disassembly of the control shaft with at least one of the first and second frame members.

31. Quick release bicycle hub assembly, which comprises: a bicycle hub assembly; a control shaft having opposed ends and passing through said hub assembly; first and second bicycle frame members operative to receive and retain the opposed ends of said control shaft; wherein at least the first of said frame members includes an open slot to receive one end of said shaft, and said second frame member includes means for a releasable, fixed connection with the opposed end of said shaft; and means for retaining said shaft relative to said frame members to engage and disengage said shaft with said frame members, wherein a first of said frame members includes an open slot and the second of said frame members has a threaded hole, wherein said shaft has a threaded end for threadably engaging said threaded hole.

32. Assembly according to claim 31, wherein the end of said shaft opposed to said threaded end includes means for turning said shaft to engage and disengage said shaft with said threaded hole.

33. Assembly according to claim 31, wherein the end of the shaft opposed to said threaded end has an enlarged collar for engagement with a cutout or recess in said first frame member.

34. Assembly according to claim 33, wherein the axial length of the threaded end of the control shaft extending from the hub assembly is shorter than the axial length of the overlapping engagement of the collar with the cutout or recess.

35. Assembly according to claim 33, wherein the axial length of the enlarged collar is greater than the axial length of the open slot in the first frame member.

36. Assembly according to claim 31, wherein said first frame member includes an enlarged opening connected to said slot.

37. Assembly according to claim 36, wherein the first frame member includes a movable portion operative to enlarge the opening in the frame member for ease of assembling said shaft into said frame member.

38. Assembly according to claim 3, wherein said threaded hole is provided by a threaded insert secured in a hole in said second frame member.

39. Assembly according to claim 38, including spring means to bias the threaded insert with respect to said second frame member.

40. Assembly according to claim 38, wherein said insert is retained in an opening in said second frame member with clearance between the insert and the opening.

41. Assembly according to claim 38, wherein said threaded insert includes male threads which mate with female threads of said shaft.

42. Assembly according to claim 38, wherein said threaded insert is secured in a hole in said second frame member.

43. Assembly according to claim 31, including means for manual rotation of said shaft, wherein the first frame member includes a boss extending towards said means for manual rotation of said shaft, and a recess in said means for manual rotation of said shaft sized to fit said boss.

* * * * *